United States Patent [19]

Lin et al.

[11] 4,448,905
[45] May 15, 1984

[54] ALCOHOL SUBSTITUTED AMIDES AS CHAIN EXTENDERS FOR POLYURETHANES

[75] Inventors: I. Sioun Lin, Oak Ridge; Stanley J. Gromelski, Jr., West Caldwell; Eugene V. Hort, Wayne; Lowell R. Anderson, Morristown, all of N.J.; Earl P. Williams, Pen Argyl, Pa.

[73] Assignee: GAF Corporation, New York, N.Y.

[21] Appl. No.: 430,573

[22] Filed: Sep. 30, 1982

[51] Int. Cl.³ .................. C08G 18/72; C08J 18/10
[52] U.S. Cl. ..................... 521/164; 528/61; 528/65; 564/201; 564/203
[58] Field of Search .............. 521/164; 528/61, 65

[56] References Cited

U.S. PATENT DOCUMENTS 3,436,463  4/1969  Mayhew et al. ............... 424/320
3,591,814  7/1971  Lloyd et al. .................. 521/164
3,663,511  5/1972  Lombardi et al. ............. 521/164

FOREIGN PATENT DOCUMENTS 2631284  1/1978  Fed. Rep. of Germany.

*Primary Examiner*—Veronica P. Hoke
*Attorney, Agent, or Firm*—Marilyn J. Maue; Joshua J. Ward; J. Gary Mohr

[57] ABSTRACT

This invention relates to the reaction products of butyrolactone and an aliphatic amine utilizable as a chain extender and curing agent for castable polyurethanes and to the process employing said products in preparing castable polyurethane elastomers and to the process for preparing the butyrolactone amine adducts. The aliphatic amine reactants employed in preparing the butyrolactoneamine adducts are defined by the formula:

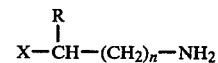

wherein X is amino (—NH$_2$) or hydroxy (—OH); R is hydrogen (—H) or methyl (—CH$_3$) and n has a value of 1 to 2, which amines are reacted with butyrolactone in a mole ratio of between about 1:1 and about 1:3 to provide a curing agent having superior mechanical properties and having the formula:

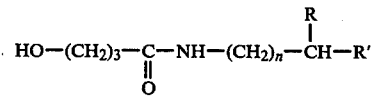

wherein R is hydrogen or methyl, R' is a hydroxy group or

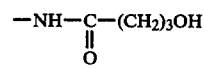

and n has a value of 1 or 2.

5 Claims, No Drawings

ALCOHOL SUBSTITUTED AMIDES AS CHAIN EXTENDERS FOR POLYURETHANES

In one aspect the invention relates to a new aliphatic curing agent for extending the chain length of polyurethane prepolymers, which agents have improved reactivities for incorporation in isocyanate terminated prepolymers. In another aspect, the invention relates to the process for curing said chain extended isocyanate terminated prepolymers.

BACKGROUND OF THE INVENTION

Polyurethane compositions obtained by curing liquid isocyanate-terminated prepolymers are finding increased use in diverse applications requiring castable elastomers. Because of their inherent toughness, outstanding resistance to abrasion, oils, solvents, chemicals, oxidation, and the wide range of hardness and flexibility from soft, flexible elastomers to rigid plastic, they are frequently used in numerous applications such as: abrasion resistant coatings; coatings on metal or fabric for belting; flexible mechanical couplings, gears and drive wheels; mallet and hammer heads; rollers for printing and feed conveying; shock absorbent pads and bumpers; solid industrial truck tires and caster wheels; and the like.

The polyurethane elastomers are linear multiblock copolymers of the $(AB)_x$ type structure. They are typically formed as the reaction product of a diisocyanate with a hydroxyl terminated polyether or polyester polyol and a low molecular weight chain extender. The elastomeric properties of these materials arise from phase separation which leads to the formation of hard and soft segments. The soft segment consist of a long polyether or polyester chain with a molecular weight in the range of 1000–2000 while the hard segments are derived from the diisocyanate (MDI, i.e. 4,4'-diphenylmethane diisocyanate or TDI, i.e. tolylene diisocyanate) and simple glycols, triols, or diamines as curing agents.

The most commonly used amine curing agents for the castable elastomers are hindered or electronegatively substituted aromatic diamines of which 3,3'-dichlorobenzidine, 4,4'-methylenebis(2-chloroaniline) and 2,5,3'-trichloro-4,4'-diaminodiphenylmethane are representative. To a lesser extent, unhindered aromatic diamines such as 4,4'-methylenedianiline and phenylenediamines are used. Some diamine curing agents possess long "pot life" which in certain cases facilitates molding operations.

There has been a need in the art, therefore, for novel chain extenders and curing agents having controlled reactivities under normal operating conditions to permit the desired degree of chain length and cure to be achieved within practical and economically attractive time ranges and having sufficiently low melting points to allow them to be readily blended with the isocyanate terminated prepolymers.

THE INVENTION

According to this invention, a 1:1 to 1:3 mole ratio of amine to a butyrolactone having the formula

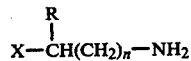

wherein X is amino or hydroxy; R is hydrogen or methyl and n has a value of 1 to 2, results in opening of the butyrolactone ring to form an adduct having the formula

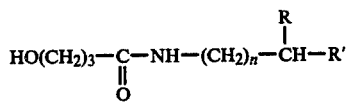

wherein R is hydrogen or methyl, n is 1 or 2 and R' is hydroxy or

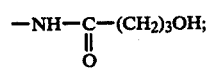

which adduct is an excellent chain extender and crosslinking agent for the polyurethane prepolymers having free isocyanates groups. Compounds of particular value are 4-hydroxy-N-(2-hydroxyethyl)butyramide,

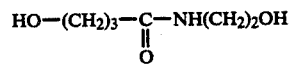

and N,N'-(1,2-propanediyl)bis-4-hydroxybutyramide,

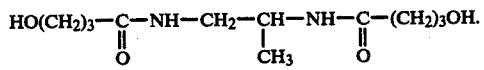

The adduct is formed at a temperature of between about 60° C. and about 120° C. under atmospheric pressure over a period of from about 8 to about 20 hours in an inert solvent, e.g. a ketone.

The present adduct is particularly adapted to crosslink with the isocyanate prepolymer and to effect polymer cure; thus providing a cured product of significantly improved tensile and tear strength and elongation properties. A melt of the adduct is combined with a polyurethane prepolymer at a temperature of between about 70° C. and about 120° C. under atmospheric pressure by stirring the chain extending agent and prepolymer for a period of from about 30 seconds to about 2 minutes.

The polyurethane prepolymers of this invention include both polyalkylene ether glycol- and polyester glycol-based polyurethanes and have a free NCO content of from about 2.5 to about 12 weight %. A typical example of the former is Adiprene ®M-400 (du Pont). The free isocyanate content of this prepolymer is about 7.5%. Another example is Adiprene ®M-467 which has a free isocyanate content of about 9.6%.

Polyurethane prepolymers can be based on other polyalkylene ether glycols, e.g. polypropylene ether glycols and mixed polyalkylene ether glycols obtained by condensation of ethylene oxide, 1,2-propylene oxide and 1,2-butylene oxide with glycols having more than two carbon atoms.

Generally, these polyether glycols can be prepared by the polymerization of cyclic ethers, such as tetrahydrofuran or epoxides or by the addition of epoxides to glycols, dihydroxyethers, dihydroxythioethers, dihydric phenols and the like by known methods. Polyalkylene ether glycols suitable for the preparation of polyurethane prepolymers should have a molecular weight of at least 500, up to about 10,000; although molecular weights of about 750 to 3000 are preferred. Optionally, glycols having molecular weights of less than about 350 can be added to the high molecular weight glycols. These low molecular weight glycols can be used in proportions of about 0.5–3.0 moles per mole of polyether glycol; however, exact proportions are determined by the desired physical properties of the final products. Representative glycols of this type include ethylene glycol, 1,2-propylene glycol, 1,2-butylene glycol, 1,3-butanediol, 1,4-butanediol, 1,5-pentanediol, 1,10-decanediol, 3-cyclohexene-1,1-dimethanol, diethylene glycol, dipropylene glycol, and the like. Mixtures of two or more of these low molecular weight glycols may be used.

Polyurethane prepolymers which can be employed in the process of this invention can also be based on polyester glycols, such as poly(ethylene adipate), poly(ethylene/propylene adipate), poly(ethylene glutarate) and poly(ethylene pimelate). Multrathane F-242 supplied by Mobay is an example of a commercially available polyester based diphenylmethanediisocyanate which is beneficially employed in the present invention.

Polyester glycols suitable for the preparation of polyurethane prepolymers can be made by several alternate routes, such as, condensation of a dicarboxylic acid with an excess of a diol, transesterification of a dicarboxylic acid ester of a lower alcohol with a diol, or reaction of dicarboxylic acid dichloride with a diol, optionally in the presence of a proton acceptor. Aliphatic dicarboxylic acids and alkanediols are preferred because of the desirable physical properties of the final products. However, aromatic dicarboxylic acids, such as terephthalic acid, and dihydric phenols, such as hydroquinone or resorcinol, also can be used in the preparation of polyester glycols suitable for making polyurethane prepolymers. Generally, the above described polyester glycols should have a molecular weight of 500–10,000, a molecular weight of 750–3000, being preferred.

Polyurethane prepolymers are made by reaction of a polyalkylene ether glycol or a polyester glycol with an excess of an organic diisocyanate. Because of their greater reactivity, aromatic diisocyanates are preferred but aliphatic or araliphatic diisocyanates also can be used. Representative isocyanates include toluene-2,4-diisocyanate, toluene-2,6-diisocyanate, benzene-1,3-diisocyanate, naphthalene-1,5-diisocyanate, methylenebis(4-phenyl isocyanate), 4,4'-biphenylenediisocyanate, hexamethylene diisocyanate, 1,4-cyclohexanediisocyanate, and methylene-bis(4-cyclohexane isocyanate). Of course, mixtures of two or more diisocyanates may be employed.

Using the present adducts, better tear strength, higher elongation and lower compression set properties than achieved with conventional diol chain extenders can be obtained.

Generally, useful polyurethane elastomers can be obtained by employing the adducts of this invention in amounts such as 95% to 105% stoichiometry. Most desirably stoichiometry is maintained at about 95% based on prepolymer content. Prepolymers are preheated at 70° to 120° C. and mixed with the present chain extender at between about 50° C. and about 100° C. Minor modifications in mixing temperatures may be made to suit individual needs. The prepolymer, curative and prepolymer-curative mixture are each vacuum degassed prior to pouring the mixture into a mold preheated to between about 70° C. and about 120° C. Degassing before and after mixing is especially important to achieve bubble-free castings. The mold is closed when gelation has started. Working life can be expected to decrease rapidly when catalyst is added to the formulation.

The upper temperature limit for blending and curing depends on the thermal stability of both the prepolymer and the curing agent. Polyurethane prepolymers having terminal isocyanate groups can undergo side reactions at elevated temperatures. For instance, the urethane groups of the polymer backbone may at elevated temperatures undergo further reactions with the hydrogen of —NH— in the amine/butyrolactone adduct to provide a 3 dimensional polymer which is particularly useful where products of high strength and rigidity are desired.

In the process of the present invention, the chain extending agent and the prepolymer may be separately degassed before mixing, one or another may be subjected to degassing before mixing, or degassing may be preformed after the chain extender and prepolymer are blended before introduction into the mold. It is to be understood that a plurality or all of these degassing steps can be used if desired, the important criteria being that the mixture introduced into the mold is completely devoid of gas bubbles or any air entrainment encountered during mixing.

The present formulation of chain extender agent and prepolymer possesses a short pot life, namely between about 1 and about 10 minutes, to provide a good curable composition. Demolding times range from 20 to 60 minutes. The elastomer post-cured for about 16 hours at a temperature between about 70° C. and about 120° C. after which it is conditioned for one week at 50% relative humidity at room temperature prior to physical-mechanical property measurements.

Having generally described the invention, reference is now had to the examples which illustrate specific and preferred embodiments of the invention; however, these embodiments are not to be construed as limiting to the scope which is properly defined in the foregoing description and disclosure and in the appended claims. In the examples which follow, all amounts and proportions are by weight unless otherwise indicated.

Also, whenever the phrase "consisting essentially of . . . " is used in this specification or in the claims, it means that the operative steps or the materials recited after the phrase are an essential part of the invention but that materials, operative steps or substitution compounds not specifically recited may be included so long as they do not prevent the advantages of the invention from being realized.

EXAMPLE 1

A. Preparation of Ethanolamine (AEO)/Butyrolactone (BLO) Adduct (1:1.05 mol ratio)

Into a 3-necked flask under a blanket of nitrogen was introduced 122.16 grams of ethanolamine and 825.68 cc of methyl ethyl ketone (mole ratio 1:3) and the contents agitated to a temperature of 75° to 80° C. butyrolactone (180.79 grams) was then added by dropping funnel over a period of 20 minutes to the flask containing the ethanolamine solution.

The resulting solution was allowed to react at 120° C. for 3 hours, after which it was cooled to room temperature. The resulting viscous material was separated and washed 3 times with a large excess of methyl ethyl ketone (about 3,000 cc total wash).

After the final washing, the methyl ethyl ketone was decanted and the product was dried in a vacuum oven at 80° C. to remove traces of methyl ethyl ketone. The product, 4-hydroxy-N-(2-hydroxyethyl)butyramide, had a melting point of 55° C. and was recovered in 92% yield.

B. Preparation of 1,2-Propanediamine (PDA)/Butyrolactone (BLO) Adduct (1:2.05 mol ratio)

Into a 3-necked flask under a blanket of nitrogen was introduced 222.39 grams of 1,2-propanediamine and 825.68 cc of methyl ethyl ketone (mole ratio 1:3) and the contents agitated to a temperature of 78° to 85° C. butyrolactone (529.4 grams) was then added by dropping funnel over a period of 20 minutes to the flask containing the 1,2-propanediamine solution.

The resulting solution was allowed to react at 78°-85° C. for 20 hours, after which it was cooled to room temperature. The resulting viscous material was separated and washed 3 times with a large excess of methyl ethyl ketone (about 3,000 cc total wash) with crystallization of product between each wash.

After the final washing the methyl ethyl ketone was decanted and the product was dried in a vacuum oven at 80° C. to remove traces of methyl ethyl ketone. The product, N,N'-(1,2-propanediyl)bis-4-hydroxybutyramide, had a melting point of 72° C. and was recovered in 81% yield.

EXAMPLE 2

100 parts, by weight, of a polyester-based MDI prepolymer was degassed at 93° C. for 40 minutes and 10.42 parts, by weight, of 4-hydroxy-N-(2-hydroxyethyl)butyramide was degassed at 70° C. prior to mixing with prepolymer. The prepolymer and curative were mixed and poured into a mold preheated to 110° C. The curing time in the mold was 40 minutes. The resulting plaque was post-cured for 16 hours at 100° C. and then conditioned for one week at 50% relative humidity at room temperature. The following mechanical properties were determined on the test plaque.

| Formulation & Physical Properties of Castable Urethane Elastomers Extended with 4-Hydroxy-N—(2-hydroxyethyl)butyramide- Based on Multrathane* F-242 at 95% stoichiometry | |
|---|---|
| Multrathane F-242*, (AE++ = 660 ± 20), g | 100 |
| (AEO + BLO)+, (AE++ = 73.5), g | 10.42 |
| Pot life, min. | 4' |
| Hardness, Shore A | 85 |
| Shore D | 32 |
| 100% Modulus, psi | 756 |
| 300% Modulus, psi | 2000 |
| Tensile strength, psi | 5418 |
| Elongation, % | 498 |
| Tear strength, Grave, Die C, % | 575 |
| Bashore, Rebound, % | 34 |
| Compression Set, 22 hrs./70° C., Method B | 25 |

*Mobay's Polyester 4,4'-diphenylmethane diisocyanate (MDI) prepolymer
+4-Hydroxy-N—(2-hydroxyethyl)butyramide
++Amine equivalent

EXAMPLE 3

100 parts by weight of a polyester-based MDI prepolymer was degassed at 93° C. for 40 minutes and 17.43 parts by weight of N,N'-(1,2-propanediyl)bis-4-hydroxybutyramide was degassed at 85° C. prior to mixing with prepolymer.

The prepolymer and curative were mixed and poured into a preheated mold (110° C.). The curing time in the mold was 40 minutes. The resulting plaque was then post-cured for 16 hours at 100° C. The elastomer was then conditioned for one week at 50% relative humidity at room temperature and the following mechanical properties were determined on the test plaque:

| Formulation & Physical Properties of Castable Urethane Elastomers Extended with N,N'—(1,2-propanediyl)bis-4-hydroxybutyramide- Based on Multrathane* F-242 at 95% stoichiometry | |
|---|---|
| Multrathane F-242* (AE++ = 660 ± 20), g | 100 |
| (PDA + BLO)+, (AE++ = 123), g | 17.43 |
| Pot life, min. sec. | 1'35" |
| Hardness, Shore A | 95 |
| Shore D | 37 |
| 100% Modulus, psi | 1082 |
| 300% Modulus, psi | 1990 |
| Tensile strength, psi | 5500 |
| Elongation, % | 510 |
| Tear strength, Grave, Die C, % | 605 |
| Bashore, Rebound, % | 31 |
| Compression Set, 22 hrs./70° C. Method B | 28 |

*Mobay's polyester MDI prepolymer.
+N,N'—(1,2-propanediyl)bis-4-hydroxybutyramide
++Amine equivalent

What is claimed is:

1. A castable elastomeric composition comprising a polyurethane and a compound having the formula

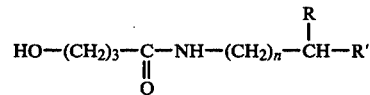

wherein R is hydrogen or methyl, R' is hydroxy or

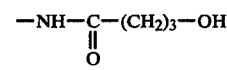

and n has a value of 1 or 2 in a mole ratio of between about 1:1 and about 1:3.

2. The composition of claim 1 wherein R of said compound is hydrogen and R' is hydroxy and n has a value of 1.

3. The composition of claim 1 wherein R of said compound is methyl and R' is

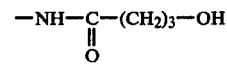

and n has a value of 1.

4. The process for preparing a polyurethane castable elastomer which comprises admixing the polyurethane and the compound having the formula

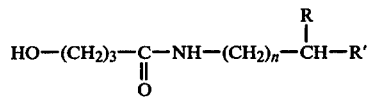

wherein R is hydrogen or methyl, R' is hydroxy or

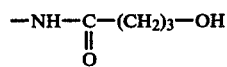
and n has a value of 1 or 2 at a temperature between about 70° C. and about 120° C.
5. The process of claim 4 wherein the polyurethane and the compound having the formula
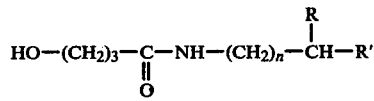
wherein R is hydrogen or methyl, R' is hydroxy or
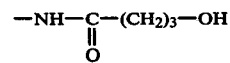
and n has a value of 1 or 2 are admixed for a period not longer than about 2 minutes.
* * * * *